Reissued Apr. 30, 1946 Re. 22,750

UNITED STATES PATENT OFFICE 22,750

DISINFECTANT

Wendell H. Tisdale, Wilmington, Del., and Ira Williams, Borger, Tex., assignors to E. I. du Pont de Nemours & Company, Wilmington, Del., a corporation of Delaware No Drawing. Original No. 1,972,961, dated September 11, 1934, Serial No. 540,202, May 26, 1931. Application for reissue August 20, 1945, Serial No. 611,684

13 Claims. (Cl. 167—22)

This invention relates to disinfectants, and more particularly to methods and means of controlling and preventing growth of fungi and microbes.

The use of sulfur, sulfides, lime sulfur, and various mixtures containing free or sulfide sulfur, phenol compounds, and mercury compounds has been suggested for disinfecting and fungicidal purposes. Various sulfur containing organic substances, thioureas, and certain xanthates have also been described for this purpose, but for one reason or another have not been wholly satisfactory. Certain of these compounds also have the disadvantage of being toxic to human beings coming in contact with them.

An object of our invention is a disinfecting material that is not only useful as a general disinfectant but is particularly useful as a fungicide and as a microbicide. A further object of our invention is a material for this purpose that is non-toxic. Another object of our invention is to provide a means for preventing the attack of wood, cotton, leather, fruit, plants and other organic material by fungus and similar growth. A still further object of our invention is to provide a means to arrest the attack of these organic materials by fungi, bacteria and the like. Other objects will be apparent as the specification proceeds.

These objects are accomplished by the following invention which comprises treating the plants or other organic material with a derivative of a dithiocarbamic acid in such manner that the dithiocarbamic acid derivative comes in contact with the parts to be protected or the fungi to be destroyed. We preferably apply these derivatives in the form of a solution, emulsion, or powder.

The materials which we employ in our method of protecting against or killing fungi are solid or liquid derivatives of dithiocarbamic acid, which contain the unaltered arrangement of nitrogen, carbon and two sulfur atoms.

Dithiocarbamic acids are those products resulting from the interaction of carbon disulfide with the more basic amines, which contain at least one hydrogen attached to the nitrogen. Among the amines which are satisfactory for this purpose are those aliphatic primary and secondary amines, which contain as substituents such groups as methyl, ethyl, ethanol, propyl, isopropyl, butyl, isobutyl, amyl, isoamyl, benzyl, allyl, crotyl, b-amino ethyl and cyclohexyl and cyclic amino compounds such as piperidine and methyl piperidine. Aromatic amines such as methyl aniline, ethyl aniline, ethyl toluidine and propyl xylidine are also suitable.

One mole of an amine

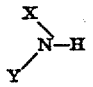

can be represented as combining with one mole of carbon disulfide to form the dithiocarbamic acid

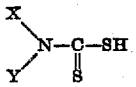

in which formula X is hydrogen or an alkyl radical. Y may represent hydrogen, an alkyl or aryl radical. The free acids as represented are somewhat unstable, and in carrying out the process of our invention we employ those derivatives in which the hydrogen is replaced and which may be represented by the formula

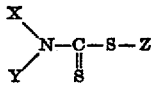

In this formula Z may be a metal, or metallic in nature, or a salt forming element or radical such as ammonium, or a derivative such as di- or triphenyl guanidine, or alkyl or aryl radicals, or

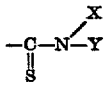

or

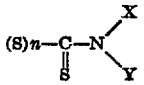

where $n$ may be any number from 1 to 3, or any other radical which when the compound is subjected to hydrolysis in aqueous sodium hydroxide will result in the formation of the sodium salt of a dithiocarbamic acid.

It will be seen that all of these compounds retain the group

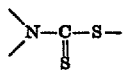

and we find that all compounds which contain this characteristic group are of value for the control of fungi of various kinds. By the proper choice of the substituents X, Y and particularly of Z the physical nature, solubility and other physical properties may be varied to best suit the requirement. For example, if X and Y are ethyl radicals and Z is the radical

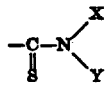

where X and Y are ethyl radicals, a liquid product is obtained from which emulsions may be prepared. If Z is sodium, potassium, calcium or a similar metal or a radical such as ammonium, methyl ammonium or dimethyl ammonium, water soluble products are formed. If Z is a metal such as zinc, mercury, copper or iron, solid materials almost completely insoluble in water will result.

Modifications of the variables also permit of combining toxic or other valuable groupings with the

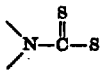

group. For an example, a dithiocarbamic acid may be made to combine with an alkaloid to produce the valuable properties of each. The following examples are not to be construed as limitations of, but serve to illustrate certain methods of carrying out our invention.

*Example I*

One part of finely divided ferric dimethyl dithiocarbamate was added to 250 parts of sterile nutrient agar. Two tubes were inoculated with a pure culture of *Aspergillus niger*. Two tubes were inoculated with a pure culture of *Fomes annosus*. In each case growth was inhibited.

*Example II*

The process of Example I was repeated using cadmium methyl ethyl dithiocarbamate with substantially the same results.

*Example III*

The process of Example I was repeated using the triphenyl guanidine salt of dimethyl dithiocarbamic acid with substantially the same results.

*Example IV*

The process of Example I was repeated using tetramethyl thiuram disulfide with substantially the same results.

*Example V*

Freshly sawed pine was dipped in an emulsion of allyl-dimethyl dithiocarbamate and a sodium salt. When stacked near similar untreated material the treated material remained bright, while the untreated material became badly stained by fungi.

*Example VI*

The process of Example V was repeated with a solution saturated with tetramethyl thiuram sulfide and tetramethyl thiuram disulfide. This solution prevented staining.

*Example VII*

Cloth was impregnated with a warm 0.1 per cent solution of tetramethyl thiuram sulfide and stored under warm damp conditions. The treated sample remained in good condition, while an untreated sample was affected with mold.

*Example VIII*

0.1 cc. of a culture of *Staphylococcus aurens* in broth was added to 5 cc. of a 0.2 per cent solution of sodium dimethyl dithiocarbamate. After fifteen minutes, neutral broth was inoculated with one drop of this mixture. No growth resulted when the culture was incubated at 37° C. for 48 hours.

*Example IX*

Wallboard made from pine wood was impregnated with a boiling 0.2 per cent solution of tetramethyl thiuram sulfide. These test pieces were then placed in test tubes containing growing cultures of *Fomes annosus*. After three week at 25° C. untreated samples showed considerable shrinkage and signs of decay, while the treated sample had lost no weight and showed no signs of decay.

*Example X*

Smut infested barley was soaked for thirty minutes in water saturated with tetramethyl thiuram sulfide at 40° C. The barley was then placed in a germinator for forty-eight hours. Microscopic examination showed that only a trace of germination resulted, while a high percentage of spores on seed which had been soaked in water had germinated.

*Example XI*

The conditions of Example X were repeated using 0.1 per cent solution of sodium dimethyl dithiocarbamate. No germination resulted.

*Example XII*

Smut infested barley was treated as in Example X with a 0.1 per cent solution of allyl-dimethyl dithiocarbamate and 0.25 per cent of dibutyl ammonium oleate. No germination of spores resulted.

*Example XIII*

The process of Example XII was repeated using 0.1 per cent ethyl-dimethyl dithiocarbamate. Only a trace of spore germination resulted.

*Example XIV*

The process of Example XII was repeated using 0.1 per cent tetra-ethyl-thiuram-monosulfide. Approximately 50 per cent of the spores were killed.

*Example XV*

The process of Example XII was repeated using 0.1 per cent sodium butyl dithiocarbamate. Approximately 70 per cent of the spores were killed.

The foregoing examples will serve to illustrate certain methods and means of carrying out our invention, but various modifications and equivalents will be apparent therefrom. For example, calcium, magnesium, or similar metals may be used to replace the sodium or potassium when a less alkaline solution is desired, or heavy hydrocarbon radicals may be substituted for X, Y or Z to promote oil solubility.

The methods of applying the material may be varied to include dusting or tumbling with powders, spraying with solutions, emulsions or suspensions, or soaking in solvents containing the active ingredient or the material may be applied directly as a paint or paste, or in a coating. We have also found that in some cases it is desirable to use a wetting agent such, for example, as Penetrol. In place of Penetrol, other wetting agents may be used, such, for example, as the alkylated naphthalene sulfonic acids known in the trade as Nekals, various soaps, Turkey red oil, etc.

Numerous applications for these solutions, suspensions, etc., other than those disclosed in the above examples are evident, for example ointments and salves or lotions for the control of skin diseases caused by bacteria, fungi, insects, mites, etc., can be prepared. The stable nature of certain of these preparations may in many instances make them of value for internal use. Other obvious applications are the disinfection of instruments, laboratories, dairy equipment, etc.

A further advantage of this invention resides in the high activity of these derivatives, which at the same time are non-toxic and free from irritating effects on the operator, or anyone coming in contact with the materials. For these reasons, these compounds are particularly valuable as general disinfectants and are very effective for the treatment of lumber or similar forms of wood for the prevention of the growth of organisms that cause decay in wood, such, for example, as *Coniphora cerebella, Fomes annosus,* and of those organisms that cause so-called "blue rot," "blue stain," or "sap stain" of lumber, such as Ceratostomella group or the Graphium group.

While certain illustrative embodiments of our invention have been given in the foregoing, it is to be understood that other embodiments will be apparent therefrom and may be practiced within the scope of our invention, and that we do not intend to be limited except as indicated in the following patent claims.

We claim:

1. In a method of disinfecting for the control of bacteria, microbes, and fungi, the step comprising contacting the organism with a disinfectant comprising a derivative of dithiocarbamic acid which contains the group

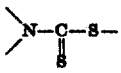

2. In a method of disinfecting for the control of bacteria, microbes, and fungi, the step comprising contacting the organism with a disinfectant comprising the reaction product of carbon disulfide and an amino compound, said product being represented by the formula

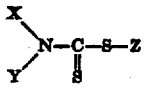

in which X is hydrogen or an alkyl radical, Y is hydrogen, an alkyl, or an aryl radical, and Z is metallic in nature, a salt forming element, an ammonium radical, or an alkyl or aryl radical, or a group represented by the formula

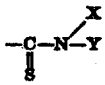

or

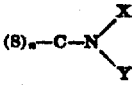

where $n$ may be any number from 1 to 3, or any other radical which when the compound is subjected to hydrolysis in aqueous sodium hydroxide will result in the formation of the sodium salt of dithiocarbamic acid.

3. The method described in claim 2 in which Z is a metal taken from a group consisting of zinc, mercury, copper, and iron.

4. In a method of disinfecting for the control of bacteria, microbes, and fungi, the step comprising contacting the organism with a disinfectant comprising a tetra-substituted thiuram monosulfide.

5. In a method of disinfecting for the control of bacteria, microbes, and fungi, the step comprising contacting the organism with a disinfectant comprising tetra-methyl-thiuram sulfide.

6. In a method of disinfecting for the control of bacteria, microbes, and fungi, the step comprising contacting the organism with a disinfectant comprising tetra-ethyl-thiuram sulfide.

7. In a method of disinfecting for the control of bacteria, microbes, and fungi, the step comprising contacting the organism with a disinfectant comprising sodium di-substituted dithiocarbamate.

8. In a method of disinfecting for the control of bacteria, microbes, and fungi, the step comprising contacting the organism with a disinfectant comprising sodium dimethyl dithiocarbamate.

9. A disinfectant useful as a bactericide, microbicide, and fungicide, the disinfectant being a powder, an emulsion, or a suspension, comprising a derivative of dithiocarbamic acid which contains the group

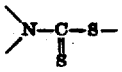

10. A disinfectant, useful as a bactericide, microbicide, and fungicide, comprising a derivative of dithiocarbamic acid which contains the group

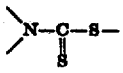

and a wetting agent.

11. A disinfectant, useful as a bactericide, microbicide, and fungicide, comprising the reaction product of carbon disulfide and an amino compound, said product being represented by the formula

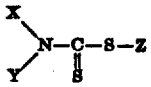

in which X is hydrogen or an alkyl radical, Y is hydrogen, an alkyl, or an aryl radical, and Z is metallic in nature, a salt forming element, an ammonium radical, or an alkyl or aryl radical, or a group represented by the formula

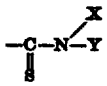

or

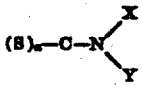

where $n$ may be any number from 1 to 3, or any other radical which when the compound is subjected to hydrolysis in aqueous sodium hydroxide will result in the formation of the sodium salt of dithiocarbamic acid, and a wetting agent.

12. The disinfectant of claim 11 in which Z is a metal taken from a group consisting of zinc, mercury, copper, and iron.

13. A disinfectant, useful as a bactericide, microbicide, and fungicide, comprising a tetra-substituted thiuram monosulfide and a getting agent.

WENDELL H. TISDALE.
IRA WILLIAMS.